(12) United States Patent  
Goulahsen

(10) Patent No.: US 8,520,493 B2  
(45) Date of Patent: Aug. 27, 2013

(54) DEVICE FOR EXCHANGING DATA BETWEEN COMPONENTS OF AN INTEGRATED CIRCUIT

(75) Inventor: Abdelaziz Goulahsen, Coublevie (FR)

(73) Assignee: STMicroelectronics (Grenoble) SAS, Grenoble (FR)

( * ) Notice: Subject to any disclaimer, the term of this patent is extended or adjusted under 35 U.S.C. 154(b) by 231 days.

(21) Appl. No.: 13/120,259

(22) PCT Filed: Sep. 17, 2009

(86) PCT No.: PCT/EP2009/062077  
§ 371 (c)(1),  
(2), (4) Date: May 27, 2011

(87) PCT Pub. No.: WO2010/031824  
PCT Pub. Date: Mar. 25, 2010

(65) Prior Publication Data  
US 2011/0235501 A1 Sep. 29, 2011

(30) Foreign Application Priority Data

Sep. 22, 2008 (FR) ...................... 08 56349

(51) Int. Cl.  
*H04J 11/00* (2006.01)  
*H04B 7/216* (2006.01)  
*H04B 1/00* (2006.01)

(52) U.S. Cl.  
USPC ............ 370/203; 370/342; 375/144; 375/146

(58) Field of Classification Search  
USPC .................................. 370/203; 375/144, 146  
See application file for complete search history.

(56) References Cited

U.S. PATENT DOCUMENTS 6,185,440 B1 * 2/2001 Barratt et al. .............. 455/562.1

OTHER PUBLICATIONS

Xin Wang et al, Applying CMDA Technique to Network-on-Chip, Oct. 2007, IEEE Transactions on VLSI System, vol. 15, p. 1091-1100.*  
International Search Report dated Dec. 22, 2009 from corresponding International Application No. PCT/EP2009/062077.  
Xin Wang et al: *Applying CDMA Technique to Network-on-Chip*, IEEE Transactions on Very Large Scale Integration (VLSI) Systems, IEEE Service Center, Piscataway, NJ, US, vol. 15, No. 10, Oct. 1, 2007, pp. 1091-1100, XP011192101.  
Lai B C et al: *CT-Bus : a Heterogeneous CDMA/TDMA Bus for Future SOC*, Signals, Systems and Computers, 2004. Conference Record of the Thirty-Eighth Asilomar Conference on Pacific Grove, CA, USA Nov. 7-10, 2004, Piscataway, NJ, USA,IEEE, vol. 2, Nov. 7, 2004, pp. 1868-1872, XP010781172.  
Manho Kim et al: *Adaptive Scheduling for CDMA-Based-Networks-on-Chip*, IEEE-Newcas Conference, 2005. The 3$^{rd}$ International Quebec City, Canada Jun. 19-22, 2005, Piscataway, NJ, USA,IEEE, Jun. 19, 2005, pp. 100-103, XP010828238.

* cited by examiner

*Primary Examiner* — Hoon J Chung  
*Assistant Examiner* — Yaotang Wang  
(74) *Attorney, Agent, or Firm* — Wolf, Greenfield & Sacks, P.C.

(57) ABSTRACT

A method for transmitting messages from first units of an integrated circuit to at least one second unit of the integrated circuit. The first units generate first digital messages and transform them into second digital messages obtained by application of an orthogonal or quasi-orthogonal transformation to the first messages. The second messages of the first units are added up and transmitted to the second unit.

22 Claims, 2 Drawing Sheets

DEVICE FOR EXCHANGING DATA BETWEEN COMPONENTS OF AN INTEGRATED CIRCUIT

CROSS REFERENCE TO RELATED APPLICATIONS

This application is a U.S. National Stage Patent Application based on PCT Application Number PCT/EP2009/062077, filed on Sep. 17, 2009, entitled "Device For Exchanging Data Between Components Of An Integrated Circuit", which application claims the priority benefit of French patent application Ser. No. 08/56349, filed on Sep. 22, 2008, entitled "Device For Exchanging Data Between Components Of An Integrated Circuit", which applications are hereby incorporated by reference to the maximum extent allowable by law.

BACKGROUND OF THE INVENTION

1. Field of the Invention

The present invention relates to a device and a method for exchanging data or messages between units, for example, microprocessors or memories, of an integrated circuit.

2. Discussion of the Related Art

Generally, the data exchange between units of an integrated circuit is performed via an interconnect unit. A unit connected to the interconnect unit which can initiate a data exchange is called a master or initiating unit, and a unit connected to the interconnect unit which can only respond to a request from an initiating unit is called a target unit or slave unit.

According to a conventional data exchange device example, the interconnect unit comprises a data exchange bus which is shared between the integrated circuit units, and an arbitration unit which controls the access to the bus. The bus is divided, for example, into a bus for transmitting addresses of locations in a memory and a data transmission bus. However, the management of the message transfer over a shared bus becomes difficult as soon as the number of initiating and target units connected to the bus is significant, especially due to the fact that all requests must transit through the arbitration unit.

Another example of data exchange unit relates to networks on chip (NoC) for which the data are exchanged in packets, with at least one packet comprising a header identifying the target unit for which the packet is intended. This includes, for example, the technology sold by STMicroelectronics Company under denomination STNoC.

Initiating units and/or target units are generally distributed in several locations of the integrated circuit and, for each initiating and target unit, the interconnect unit comprises conditional logic elements, for example, multiplexers via which the data to be transmitted are selected. With the increase in the number of initiating and target units and current constraints relative to the size of integrated circuits, it becomes more and more difficult to design the interconnect unit, that is, to have at the integrated circuit level the elements forming the interconnect unit for connecting all the initiating and target units of the integrated circuit.

The quality of service of a data exchange device can be defined as the capacity of the device to transmit data in good conditions in terms of availability, bit rate, transmit delays, etc. One of the parameters defining the quality of service is the latency, which corresponds to the time elapsing between the transmission of a request by an initiating unit and the time when the requested operation is performed. Another parameter is the bandwidth, which corresponds to the amount of data that can transit through the interconnect unit within a given time. Another parameter of the quality of service corresponds to the capacity of the device to provide the initiating and target units bit rates and response times which are different for each unit. This is called allocating the resources of the data exchange device.

It appears to be difficult to obtain a satisfactory quality of service with existing data exchange devices. In particular, the differentiated allocation according to units, modifiable along time, of the resources of the data exchange device is difficult to implement in a simple way.

SUMMARY OF THE INVENTION

At least one embodiment of the present invention aims at solving all or part of the previously-described disadvantages, as well as others.

In particular, at least one embodiment of the present invention aims at eliminating the use of conditional logic elements at the interconnect unit level to ease the design of a data exchange device between units of an integrated circuit.

According to another object, the data exchange device provides a simple way to modify the resource allocation between initiating units.

To achieve all or part of these objects as well as others, an embodiment of the present invention provides a method for transmitting messages from first units of an integrated circuit to at least one second unit of the integrated circuit. The first units generate first digital messages and transform them into second digital messages obtained by application of an orthogonal or quasi-orthogonal transformation to the first messages. The second messages of the first units are added up and transmitted to the second unit.

According to an embodiment of the present invention, the method comprises the steps of:

(a) having each first unit, for each first message to be transmitted, provide, at successive cycles, the second messages by applying the orthogonal or quasi-orthogonal transformation to said first message;

(b) providing, at each cycle, a third message by addition of the second messages provided by the first units in said cycle;

(c) successively transmitting the third messages to the second unit; and (d) having the second unit decode the third messages to recover the first messages.

According to an embodiment of the present invention, one vector from among orthogonal vectors is associated with each first unit. At step (a), for each first unit, the bits at a given position of the second messages are obtained from the bit at the given position of the first message and of the associated vector. At step (d), the bit of the first message of one of the first units at the given position is obtained from the bits at the given position of the third messages.

According to an embodiment of the present invention, the method comprises modifying the allocation of the vectors according to the first units along time.

According to an embodiment of the present invention, the method comprises allocating, to at least one of the first units, several vectors from among the orthogonal vectors, said first unit simultaneously transmitting several second messages obtained from the first messages and from said several associated vectors.

According to an embodiment of the present invention, each vector is obtained from one of the lines of a matrix corresponding to the binary representation of a Hadamard matrix.

According to an embodiment of the present invention, at step (d), the bit of the first message of one of the first units at the given position is obtained from the bits at the given position of the third messages and from the associated line of the Hadamard matrix.

An embodiment of the present invention also provides an integrated circuit comprising first units and at least one second unit connected to an interconnect unit. The first units are capable of providing second digital messages by application of an orthogonal or quasi-orthogonal transformation to first digital messages. The interconnect unit comprises adders capable of adding up the second messages from the first units and a bus for transmitting the added second messages to the second unit.

According to an embodiment of the present invention, the interconnect unit comprises no conditional logic element.

According to an embodiment of the present invention, each first unit is capable, for each first message to be transmitted, of providing, at successive cycles, the second messages by applying the orthogonal or quasi-orthogonal transformation to the first message. The adders are capable, at each cycle, of providing a third message by addition of the second messages provided by the first units in said cycle. The transmit bus is capable of successively transmitting the third messages to the second unit. The second unit is capable of decoding the third messages to recover the first messages.

According to an embodiment of the present invention, one vector from among orthogonal vectors is associated with each first unit. Each first unit is capable of providing the bits at a given position of the second messages based on the bit at the given position of the first message and on the associated vector. The second unit is capable of providing the bit of the first message of one of the first units at the given position based on the bits at the given position of the third messages.

According to an embodiment of the present invention, the circuit comprises a controller capable of modifying the allocation of the vectors according to the first units along time.

According to an embodiment of the present invention, the circuit comprises a number P of adders. Each second message is coded over a number M of bits. The adders form a succession of adders. Each adder is connected to one of the first units by a parallel connection of transmission of at least a number M of bits. One of the adders is connected to the second unit by the transmit bus. Said transmit bus is capable of transmitting in parallel a number T of bits with:

$T = \text{Ceil}(\text{Log}_2(P)*M) + Y$ where Ceil corresponds to the ceiling function, where $\text{Log}_2$ corresponds to the to base-2 logarithm function, and where Y is an integer, possibly zero, corresponding to bits which do not belong to the third messages.

According to an embodiment of the present invention, at least one of the first units is connected to the associated adder by a parallel connection of transmission of a number of bits equal to the product of number M and of an integer greater than or equal to 2.

An embodiment of the present invention also provides an electronic device comprising an integrated circuit such as defined hereabove.

The foregoing objects, features, and advantages of the present invention will be discussed in detail in the following non-limiting description of specific embodiments in connection with the accompanying drawings.

DETAILED DESCRIPTION

Figure 1:
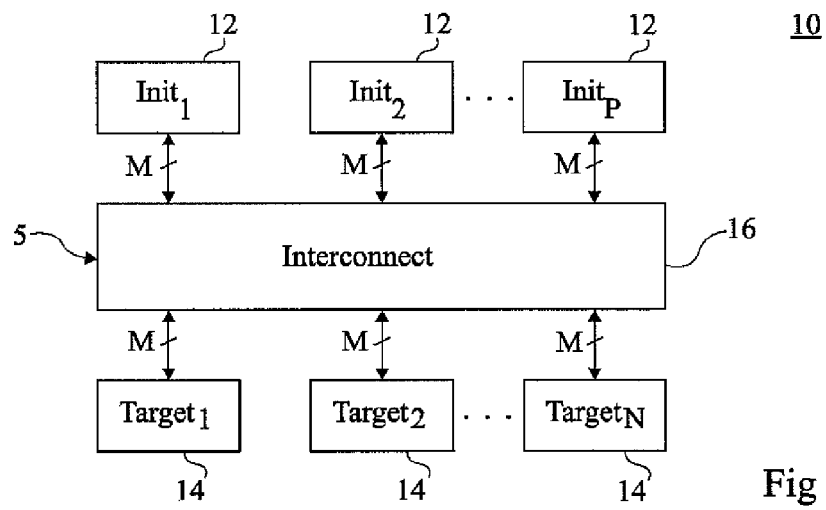
FIG. 1 schematically shows a data exchange device of an integrated circuit.

For clarity, the same elements have been designated with the same reference numerals in the different drawings.

FIG. 1 shows in the form of a block diagram an embodiment of a data exchange device 5 of an integrated circuit 10.

Integrated circuit 10 comprises a number P of initiating units 12 ($\text{Init}_1$, $\text{Init}_2$, . . . . $\text{Init}_P$) capable of exchanging data with a number N of target units ($\text{Target}_1$, $\text{Target}_2$, . . . $\text{Target}_N$) 14. An initiating unit corresponds, for example, to a processor, to an interface with an external bus, etc. A target unit 14 for example corresponds to a RAM. Number P is at least greater than or equal to 2. Number N may be equal to 1. The data exchange is performed via an interconnect unit 16. Each initiating unit 12 and each target unit 14 is capable of exchanging with interconnect unit 16 messages each having a number M of bits.

Figure 2:
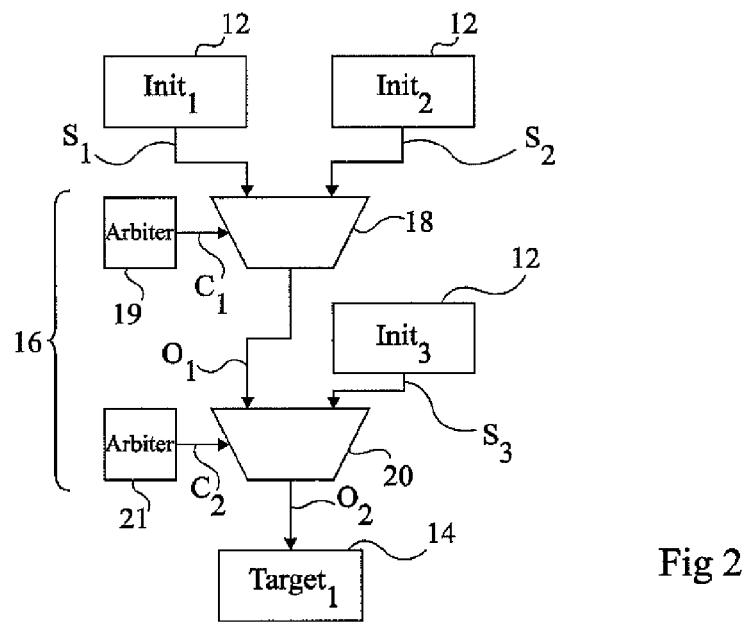
FIG. 2 partially and schematically illustrates a conventional embodiment of an interconnect device.

FIG. 2 partially and schematically shows a conventional embodiment of an interconnect unit 16 with a shared bus for the transmission of a 1-bit signal from three initiating units 12 ($\text{Init}_1$, $\text{Init}_2$, and $\text{Init}_3$) to a target unit 14 ($\text{Target}_1$). Initiating unit $\text{Init}_1$ provides a one-bit signal $S_1$ to a first input of a multiplexer 18. Initiating unit $\text{Init}_2$ provides a one-bit signal $S_2$ to the second input of multiplexer 18. Multiplexer 18 is controlled by a control signal $C_1$ provided by an arbiter unit 19. Output $O_1$ of multiplexer 18 is provided to an input of a multiplexer 20. Initiating unit $\text{Init}_3$ provides a one-bit signal to the second input of multiplexer 20. Multiplexer 20 is controlled by a control signal $C_2$ provided by an arbiter unit 21. Output $O_2$ of multiplexer 20 is provided to target unit 14. According to the control signals $C_1$ and $C_2$ provided by arbiter units 19, 21, target unit 14 receives one of signals $S_1$, $S_2$, or $S_3$. The assembly comprising arbiter units 19, 21, multiplexers 18, 20, and the connections between multiplexers 18, 20 and units $\text{Init}_1$ to $\text{Init}_3$ and $\text{Target}_1$ forms interconnect unit 16.

With interconnect unit 16, only the message provided by one of the initiating units can be effectively transmitted to one of the target units at a given time. Further, given that the selection of the message to be transmitted is performed via conditional logic elements, for example, multiplexers, the design of interconnect unit 16 soon becomes complex when the number of initiating units increases, especially due to the fact that the initiating units are generally distributed at different locations of the integrated circuit. Further, the presence of conditional logic elements at the level of interconnect unit 16 causes a frequency limitation of the data transfer.

An embodiment of the present invention provides a data exchange device comprising an interconnect unit which comprises no conditional logic element. To achieve this, an embodiment of the present invention provides having an initiating unit code each initial message to be transmitted according to an orthogonal or quasi-orthogonal transformation. The coded messages provided by the initiating units are then added up to form intermediary messages transmitted over the shared bus. A decoding unit extracts the different initial messages from the intermediary messages, to provide them to the corresponding target units. The interconnect unit thus only comprises adders. The design of the interconnect unit is thus simplified. Advantageously, the initial messages correspond to messages which would be provided by a method for transmitting messages in packets over a network on-chip.

Figure 3:
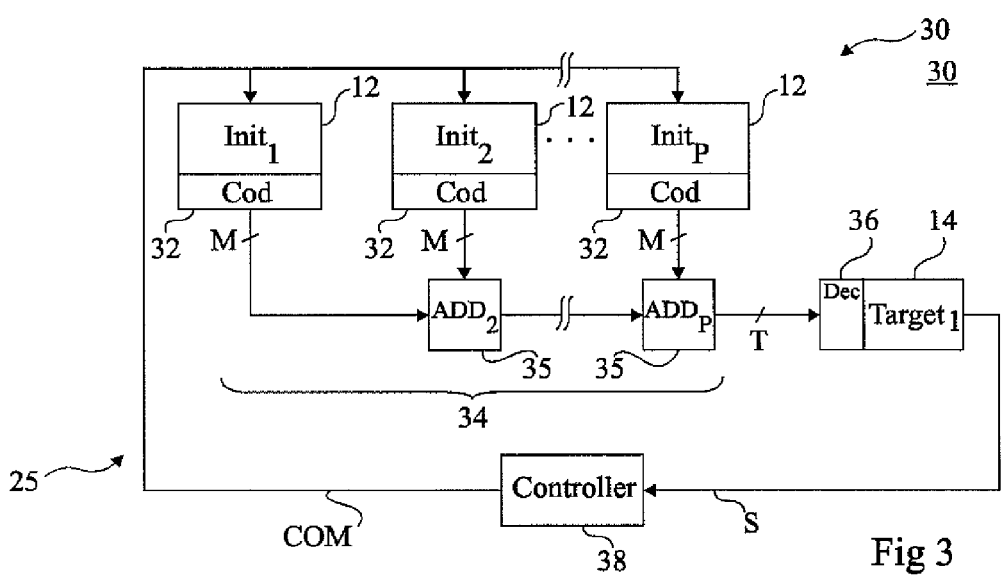
FIG. 3 partially and schematically shows an embodiment of a data exchange device according to the present invention illustrating the transmission of data from initiating units to target units of an integrated circuit.

FIG. 3 shows an embodiment according to the present invention of a data exchange device 25 of an integrated circuit 30. In the present embodiment, circuit 30 comprises a single target unit 14 (Target$_1$). Device 25 comprises a coding unit 32 at the level of each initiating unit 12 and an interconnect unit 34 comprising adders 35 (ADD$_2$, . . . ADD$_P$) connected one after the other. As a variation, a coding unit 32 may be common to several initiating units 12. Each coding unit 32 provides, from an initial message to be transmitted, a number Q of coded messages, each having M bits, at successive cycles of operation of interconnect unit 34. Interconnect unit 34 calculates, for each successive cycle, the sum of the P coded messages to obtain an intermediary message coded over T bits. Each intermediary message is provided to a decoding unit 36. Decoding unit 36 determines from the Q received intermediary units the initial messages, which are transmitted to target unit 14.

More specifically, each adder ADD$_i$, where i is an integer ranging between 3 and P, receives the coded message provided by the coding unit 32 associated with initiating unit Init$_i$ and the message provided by adder ADD$_{i-1}$. Adder ADD2 receives the messages provided by the coding units 32 associated with initiating units Init$_1$ and to Init$_2$. Adder ADD$_P$ provides the intermediary message to decoding unit 36.

According to another embodiment, circuit 30 comprises several target units 14. A same decoding unit 36 can then be connected to each target unit and, after decoding, direct each initial message towards the target unit 14 for which the initial message is intended. As a variation, each target unit 14 may comprise its own decoding unit 36.

Integrated circuit 30 also comprises a controller 38 receiving a signal S issued by target unit 14 and providing a control signal COM to initiating units 12.

In the following description, the message to be transmitted by initiating unit Init$_i$, with i ranging between 1 and P, will be called initial message mes$_i$. Further, the bit at position j of message mes$_i$, with j ranging between 1 and M, will be called bit_mes$_{i,j}$. The coded message issued at a time $t_k$, with k ranging between 1 and Q, by initiating unit Init$_i$ based on signal mes$_i$, will be called coded message mes'$_{i,k}$. The bit at position j of coded message mes'$_{i,k}$ will be called bit_mes'$_{i,k,j}$. The intermediary message received by decoding unit 36 at time k will be called mes_int$_k$.

Figure 4:
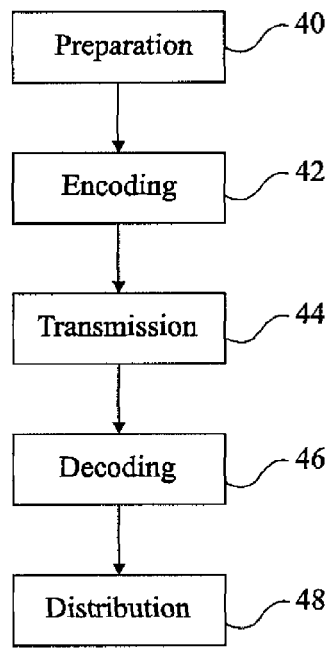
FIG. 4 shows in the form of a block diagram a timing diagram of a data transmission by the device of FIG. 3.

FIG. 4 shows, in the form of a block diagram, an example of a message transmission method from initiating units 12 to target unit 14.

At step 40, each initiating unit Init$_i$ prepares initial message mes$_i$ to be transmitted. As an illustration, P is considered to be equal to 3 and M is considered to be equal to 4. The initial messages to be transmitted by initiating units Init$_1$, Init$_2$, and Init$_3$ are, for example, provided by the following relations:

$$mes_1 = \text{"0 1 0 1"}$$

$$mes_2 = \text{"1 1 0 0"}$$

$$mes_3 = \text{"0 0 1 1"} \qquad (1)$$

At step 42, coding unit 32 of initiating unit Init$_i$ determines the coded messages mes'$_{i,k}$ to be transmitted, with k ranging between 1 and Q, based on initial message mes$_i$. In the present embodiment, to enable the simultaneous transmission of messages by the P initiating units 12, the coding uses coding vectors $V_h$, where h is an integer ranging between 1 and P. Coding vectors $V_h$ are obtained from a Hadamard matrix. They have a dimension P+1. Position coordinate q of coding to vector $V_h$ is called coor_$V_{h,q}$.

To obtain the coding vectors, the following Hadamard function H of dimension (P+1)*(P+1) is used:

$$H = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \qquad (2)$$

Call $H_{h,g}$ the element of matrix H at line h and at column g. A pseudo-Hadamard function H' is obtained by replacing each value "1" of Hadamard matrix H with value "0" and each value "−1" with value "1". Matrix H' corresponds to the binary representation of matrix H. Matrix H' corresponding to matrix H of relation (2) is the following:

$$H' = \begin{pmatrix} x & x & x & x \\ 0 & 1 & 0 & 1 \\ 0 & 0 & 1 & 1 \\ 0 & 1 & 1 & 0 \end{pmatrix} \qquad (3)$$

The first line of matrix H' is not taken into account, which is indicated by symbols "x". Call H'$_{h,g}$ the element of matrix H' at line h and at column g.

The coordinates coor_$V_{h,q}$ of coding vector $V_h$ are defined from matrix H' as follows:

$$\text{coor\_}V_{h,q} = H'_{h+1,q} \qquad (4)$$

In the present example given as an illustration, coding vectors $V_1, V_2, V_3$ are:

$$V_1 = \begin{pmatrix} 0 \\ 1 \\ 0 \\ 1 \end{pmatrix}, \qquad (5)$$

$$V_2 = \begin{pmatrix} 0 \\ 0 \\ 1 \\ 1 \end{pmatrix},$$

-continued $$V_3 = \begin{pmatrix} 0 \\ 1 \\ 1 \\ 0 \end{pmatrix}$$

In the present embodiment, coding vector $V_i$ is associated with initiating unit $Init_i$. For each initial message $mes_i$, the decoding unit determines number Q of coded messages $mes'_{i,k}$, with k ranging between 1 and Q. In the present embodiment, Q is equal to P+1. More specifically, for each bit $bit\_mes_{i,j}$ of initial message $mes_i$, the associated coding unit 32 determines bit $bit\_mes'_{i,j,k}$ of coded message $mes'_{i,k}$ as follows:

$$bit\_mes'_{i,j,k} = bit\_mes_{i,j} \oplus coor\_V_{i,k} \tag{6}$$

where symbol $\oplus$ corresponds to the logic XOR operation. With initial messages $mes_1$, $mes_2$, and $mes_3$ of the previous example given as an illustration, the following coded messages are obtained:

| | | | |
|---|---|---|---|
| $mes'_{1,1}$ = "0 1 0 1" | $mes'_{2,1}$ = "1 1 0 0" | $mes'_{3,1}$ = "0 0 1 1" | (7) |
| $mes'_{1,2}$ = "1 0 1 0" | $mes'_{2,2}$ = "1 1 0 0" | $mes'_{3,2}$ = "1 1 0 0" | |
| $mes'_{1,3}$ = "0 1 0 1" | $mes'_{2,3}$ = "0 0 1 1" | $mes'_{3,3}$ = "1 1 0 0" | |
| $mes'_{1,4}$ = "1 0 1 0" | $mes'_{2,4}$ = "0 0 1 1" | $mes'_{3,4}$ = "0 0 1 1" | |

At step 44, messages $mes'_{i,k}$ are successively transmitted to interconnect unit 34 at successive times $t_k$, with k ranging between 1 and P+1. Coded messages $mes'_{i,k}$ are added bitwise by adders 35 as they are transmitted to decoding unit 36. Intermediary message $mes\_int_k$, received at time $t_k$ by decoding unit 36, is formed of the juxtaposition of M elementary messages $el\_mes\_int_{k,j}$, with j ranging between 1 and M. The digit value of each elementary message $el\_mes\_int_{k,j}$ is provided by the following relation:

$$el\_mes\_int_{k,j} = \sum_{i=1}^{P} bit\_mes'_{i,k,j} \tag{8}$$

In the additions of coded messages $mes'_{i,k}$, with i ranging between 1 and P, to transmit intermediary message $mes\_int_k$, the number of "wires" forming interconnect unit 34 and connecting adders 35 together all the way to decoding unit 36 steadily increases to enable a binary coding of elementary intermediary messages $el\_mes\_int_{k,j}$. Indeed, number T of bits of intermediary message $mes\_int_k$, that is, the number of "wires" between adder $ADD_P$ associated with initiating unit $Init_P$ and decoding unit 36, is provided by the following relation:

$$T = Ceil(Log_2(P)*M) \tag{9}$$

where Ceil corresponds to the ceiling function and where $Log_2$ corresponds to the base-2 logarithmic function. In practice, number T may be slightly greater than the value provided by relation (9), where some bits of message $mes\_int_k$ may be reserved for other functions. In the example given as an illustration, by representing the intermediary messages, not in binary form but as a line vector having its coordinates corresponding to the digit values of the elementary intermediary messages, the intermediary messages are provided by the following relations:

$$mes\_int_1 = \text{"1 2 1 2"}$$

$$mes\_int_2 = \text{"3 2 1 0"}$$

$$mes\_int_3 = \text{"1 2 1 2"}$$

$$mes\_int_4 = \text{"1 0 3 2"} \tag{10}$$

At step 46, decoding unit 36 determines initial messages $mes_i$, with i ranging between 1 and P, based on intermediary messages $mes\_int_k$, with k ranging between 1 and Q=P+1. For this purpose, the decoding unit uses Hadamard matrix H. Bit $bit\_mes_{i,j}$ is obtained as follows:

$$bit\_mes_{i,j} = sign\left(\sum_{k=1}^{P+1} H_{i+1,k} * el\_mes\_int_{k,j}\right) \tag{11}$$

where sign corresponds to the sign function, sign(x) being equal to "1" when value x is positive or zero and equal to "0" otherwise.

In the previous example given as an illustration, the bits of initial message $mes_1$ are obtained as follows:

$$bit\_mes_{1,1} = sign(1-3+1-1) = sign(-2) = \text{"0"}$$

$$bit\_mes_{1,2} = sign(2-2+2-0) = sign(2) = \text{"1"}$$

$$bit\_mes_{1,3} = sign(1-1+1-3) = sign(-2) = \text{"0"}$$

$$bit\_mes_{1,4} = sign(2-0+2-2) = sign(2) = \text{"1"} \tag{12}$$

At step 48, decoding unit 36 transmits the restored initial messages to target unit 14.

Figure 5:
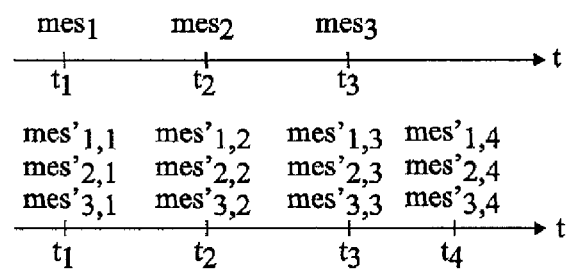
FIG. 5 schematically shows a timing diagram of a data transmission by a conventional exchange device and by the exchange device of FIG. 3.

FIG. 5 schematically shows the order of the transmission of messages by a conventional data exchange device and by the data exchange device according to the present embodiment in the previous example given as an illustration, where three initiating units $Init_1$, $Init_2$, and $Init_3$ must each transmit one message, respectively $mes_1$, $mes_2$, and $mes_3$.

For a conventional data exchange device, the initiating units each successively transmit their message. As an example, at time $t_1$, initiating unit $Init_1$ transmits message $mes_1$, while the other initiating units transmit no message, at time $t_2$, initiating unit $Init_2$ transmits message $mes_2$, while the other initiating units transmit no message, and at time $t_3$, initiating unit $Init_3$ transmits message $mes_3$, while the other initiating units transmit no message.

According to the present embodiment of the present invention, at time $t_1$, the initiating units simultaneously transmit coded messages $mes'_{1,1}$, $mes'_{2,1}$, and $mes'_{3,1}$. At time $t_2$, the initiating units simultaneously transmit coded messages $mes'_{1,2}$, $mes'_{2,2}$, and $mes'_{3,2}$. At time $t_3$, the initiating units simultaneously transmit coded messages $mes'_{1,3}$, $mes'_{2,3}$, and $mes'_{3,3}$, and at time $t_4$, the initiating units simultaneously transmit coded messages $mes'_{1,4}$, $mes'_{2,4}$, and $mes'_{3,4}$. At time $t_4$, decoding unit 36 determines the three messages $mes_1$, $mes_2$, and $mes_3$ based on the received intermediary messages, which each correspond to the sum of the coded messages provided at times $t_1$ to $t_4$.

FIG. 5 shows that the transmission message method according to the present embodiment of the present invention requires one additional elementary cycle of operation with respect to a conventional method to ensure the transmission of messages $mes_1$, $mes_2$, and $mes_3$.

However, the Applicant has shown that the increase in the number of cycles is compensated by the increase in the data transmission frequency which can be implemented due to the simplification of the structure of interconnect unit 34. The increase in the global data transmission rate performances of data exchange device 25 according to the present embodiment with respect to a conventional data exchange device, for example having the structure previously described in relation with FIG. 2, is indicated in the following table for several examples of numbers of initiating units P:

| Number of initiating units P | 3 | 7 | 15 | 31 |
|---|---|---|---|---|
| Increase in the number of cycles of operation | 25% | 12% | 6% | 3% |
| Operating frequency increase | 30% | 30% | 35% | 35% |
| Performance increase | 5% | 18% | 24% | 27% |

Further, the Applicant has shown that for each bit $bit\_mes_{i,j}$ of a message $mes_i$, it may not be necessary to transmit all bits $bit\_mes'_{i,k,j}$ with k ranging between 1 and P+1. This can enable to decrease the number of bits to be transmitted and thus to further simplify the structure of interconnect unit 34.

Figure 6:
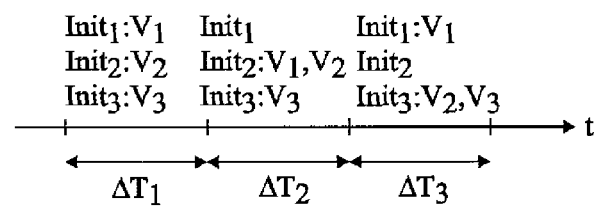
FIG. 6 schematically illustrates an example of the variation of the allocation between initiating units of the resources of the data exchange device of FIG. 3.

FIG. 6 illustrates an embodiment of the allocation of the resources of data exchange device 25 according to the present embodiment of the present invention for the transmission of messages by initiating units 12. According to the present embodiment of the present invention, the resource allocation is performed by allocating to each initiating unit a number of coding vectors $V_h$, possibly zero, that it may use. The distribution of the coding vectors between initiating units may vary along time. Allocating several coding vectors to a same initiating unit enables a same initiating unit to simultaneously transmit several initial messages. The allocation of the coding vectors between initiating units is performed by controller 38.

Successive operation phases $\Delta T_1$, $\Delta T_2$, and $\Delta T_3$ of data exchange device 25 have been shown as an example in FIG. 6. During phase $\Delta T_1$, coding vector $V_1$ is assigned to initiating unit $Init_1$, coding vector $V_2$ is assigned to initiating unit $Init_2$, and coding vector $V_2$ is assigned to initiating unit $Init_3$. During operation phase $\Delta T_1$, in each elementary cycle of operation of the interconnect unit, each initiating unit may transmit a coded message to interconnect unit 34. During operation phase $\Delta T_2$, no coding vector is assigned to initiating unit $Init_1$, two coding vectors $V_1$ and $V_2$ are assigned to initiating unit $Init_2$, and coding vector $V_3$ is assigned to initiating unit $Init_3$. This means that initiating unit $Init_2$ transmits to interconnect unit 34, in each elementary cycle of operation, two coded messages associated with two different initial messages, and that initiating unit $Init_3$ transmits a coded message associated with a single initial message. Everything happens as if initiating unit $Init_2$ would simultaneously transmit two initial messages. During operation phase $\Delta T_2$, initiating unit $Init_1$ transmits no message. During operation phase $\Delta T_3$, coding vector $V_1$ is assigned to initiating unit $Init_1$, two coding vectors $V_2$ and $V_3$ are assigned to initiating unit $Init_3$ and no coding vector is assigned to initiating unit $Init_2$. This means that initiating unit $Init_3$ transmits to interconnect unit 34, in each elementary cycle of operation, two coded messages associated with two different initial messages. Everything occurs as if initiating unit $Init_3$ would simultaneously transmit two initial messages. During operation phase $\Delta T_3$, initiating unit $Init_2$ transmits no message.

To enable an initiating unit $Init_i$ to simultaneously transmit a number W of coded messages, initiating unit $Init_i$ must be connected to the associated adder $ADD_i$ by a connection enabling transmission of W times M bits. To enable the allocation of at least one additional coding vector to a same initiating unit $Init_i$ without having to increase the number of "wires" connecting the output of adder $ADD_i$ to adder $DD_{i+1}$, a coding vector normally assigned to an initiating unit $Init_j$, where j is strictly smaller than i, just has to be assigned to an initiating unit $Init_i$.

The present embodiment of the present invention thus enables to modify the authorized transmission rate for each user unit. Further the allocation of the coding vectors during phases of operation may be performed by controller 38 in software fashion, which enables to easily adapt it to each type of integrated circuit. The to resource allocation according to the successive phases of operation may be set once and for all. As a variation, controller 38 may take into account signal S provided by target unit 14 to modify the control vector allocation. Signal S may be issued by unit 14 after decoding of the messages issued by the initiating units. Thereby, an initiating unit may transmit a resource allocation increase request. This request will then be passed on by target unit 14 to controller 38. According to a variation, each initiating unit or at least some of them are directly connected to controller 38 to directly transmit to controller 38 a resource allocation increase request.

Figure 7:
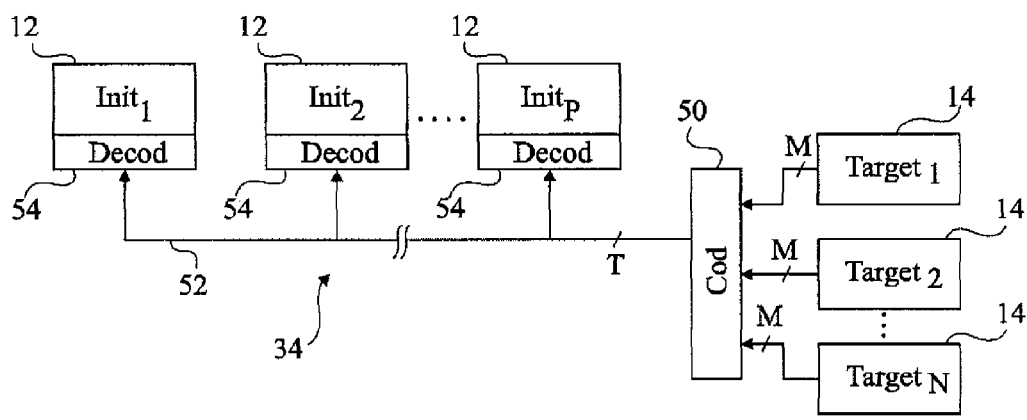
FIG. 7 partially and schematically shows an embodiment of a data exchange device according to the present invention illustrating the transmission of data from the target units to the initiating units.

FIG. 7 shows an embodiment of interconnect unit 34 illustrating the transmission of messages from target units 14 to initiating units 12. Target units 14 are connected to a coding unit 50 (Cod) capable of issuing over a data transmission bus 52, coded messages to initiating units 12. Each target unit 14 is connected to coding unit 50 by an M-bit connection. Bus 52 is a T-bit bus. Each initiating unit 12 is associated with a decoding unit 54 (Decod) receiving the messages transmitted over bus 52.

The data transmission from target units 14 to initiating units 12 is performed similarly to what has been previously described for the data transmission from initiating units 12 to target units 14. The messages to be transmitted by target units 14 are coded similarly to what has been previously described, for example, by using an orthogonal transformation using a Hadamard matrix. The intermediary message transmitted over bus 52 is then decoded by each decoding unit 54 to recover the initial message intended for the associated initiating unit 12.

Specific embodiments of the present invention have been described. Various alterations and modifications will occur to those skilled in the art. In particular, in the embodiment described in relation with FIG. 7, coding unit 50 is common to target units 14. However, each target unit 14 may be associated with a specific coding unit. In this case, bus 52 comprises adders adding up the messages provided by each coding unit similarly to what has been previously described in relation with FIG. 3 for the addition of the coded messages provided by the coding units associated with the initiating units. Further, in the embodiment described in relation with FIG. 3, a sequencing stage based on flip-flops may be provided between the adders 35 of at least one pair of successive adders, which amounts to providing a pipeline architecture for interconnect unit 34.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for transmitting messages from first units of an integrated circuit to at least one second unit of the integrated circuit, comprising:
   generating through the first units first digital messages;
   transforming said first digital messages into second digital messages, obtained by application of an orthogonal or quasi-orthogonal transformation to the first messages; and
   adding the second messages of the first units and transmitting to the second unit, wherein one vector from among orthogonal vectors is associated with each first unit, the transforming further comprising assigning, to at least one of the first units, several vectors from among the orthogonal vectors, said at least one of the first units simultaneously transmitting several of the second messages obtained from the first messages and from said several vectors.

2. The method of claim 1, comprising the steps of:
   (a) having each first unit, for each first message to be transmitted, provide, at successive cycles, the second messages by applying the orthogonal or quasi-orthogonal transformation to said first message;
   (b) providing, at each cycle, a third message by addition of the second messages provided by the first units in said cycle;
   (c) successively transmitting the third messages to the second unit; and
   (d) having the second unit decode the third messages to recover the first messages.

3. The method of claim 2, wherein, at step (a), for each first unit, the bits at a given position of the second messages are obtained from the bit at the given position of the first message and of the associated vector and wherein, at step (d), the bit of the first message of one of the first units at the given position is obtained from the bits at the given position of the third messages.

4. The method of claim 3, comprising modifying the allocation of the vectors according to the first units along time.

5. The method of claim 4, wherein each vector is obtained from one of the lines of a matrix corresponding to the binary representation of a Hadamard matrix.

6. The method of claim 5, wherein at step (d), the bit of the first message of one of the first units at the given position is obtained from the bits at the given position of the third messages and from the associated line of the Hadamard matrix.

7. An integrated circuit comprising first units and at least one second unit connected to an interconnect unit, wherein the first units are capable of providing second digital messages by application of an orthogonal or quasi-orthogonal transformation to first digital messages, the interconnect unit comprising adders capable of adding up the second messages from the first units and a bus for transmitting the added second messages to the second unit, wherein the adders comprise a number P of adders, wherein each second message is coded over a number M of bits, and wherein the adders form a succession of adders, each adder being connected to one of the first units by a parallel connection of transmission of at least a number M of bits, one of the adders being connected to the second unit by the transmit bus, said transmit bus being capable of transmitting in parallel a number T of bits with:

$$T = \mathrm{Ceil}(\mathrm{Log}\, 2(P)*M) + Y$$

where Ceil corresponds to the ceiling function, where Log 2 corresponds to the base-2 logarithm function, and where Y is an integer, possibly zero, corresponding to bits which do not belong to the third messages.

8. The integrated circuit of claim 7, wherein the interconnect unit comprises no conditional logic element.

9. The integrated circuit of claim 7, wherein each first unit is capable, for each first message to be transmitted, of providing, at successive cycles, the second messages by applying the orthogonal or quasi-orthogonal transformation to the first message, wherein the adders are capable, at each cycle, of providing a third message by addition of the second messages provided by the first units in said cycle, wherein the transmit bus is capable of successively transmitting the third messages to the second unit, and wherein the second unit is capable of decoding the third messages to recover the first messages.

10. The integrated circuit of claim 9, wherein one vector from among orthogonal vectors is associated with each first unit, and wherein each first unit is capable of providing the bits at a given position of the second messages based on the bit at the given position of the first message and on the associated vector and wherein the second unit is capable of providing the bit of the first message of one of the first units at the given position based on the bits at the given position of the third messages.

11. The integrated circuit of claim 10, comprising a controller capable of modifying the allocation of the vectors according to the first units along time.

12. The integrated circuit of claim 7, wherein at least one of the first units is connected to the associated adder by a parallel connection of transmission of a number of bits equal to the product of number M and of an integer greater than or equal to 2.

13. An electronic device comprising the integrated circuit of claim 7.

14. A method for transmitting messages from first units of an integrated circuit to at least one second unit of the integrated circuit, comprising:
   generating, by the first units, first messages and transforming the first messages into second messages by application to the first messages of coding vectors obtained from a Hadamard matrix;
   adding, by an interconnect unit, the second messages to provide intermediary messages and transmitting the intermediary messages to the at least one second unit;
   receiving, by the at least one second unit, the intermediary messages and decoding the intermediary messages to recover the first messages; and
   assigning to at least one of the first units several of the coding vectors, the at least one first unit simultaneously providing several of the second messages obtained from the first messages and from the several coding vectors.

15. A method as defined in claim 14, wherein generating and transforming comprises providing the second messages on successive cycles of the integrated circuit and wherein adding the second messages and transmitting the intermediary messages comprises providing an intermediary message on each cycle of the integrated circuit.

16. A method as defined in claim 15, wherein one coding vector of the coding vectors is associated with each of the first units, wherein the bits at a given position of the second messages are obtained from the bit at the given position of the first message and of the associated coding vector and wherein the bit of the first message of one of the first units at the given position is obtained from the bits at the given position of the intermediary messages.

17. A method as defined in claim 14, further comprising modifying an allocation of the coding vectors to the first units as a function of time.

18. An integrated circuit comprising:
   first units configured to generate first messages and to transform the first messages into second messages by application to the first messages of coding vectors obtained from a Hadamard matrix;

an interconnect unit configured to add the second messages to provide intermediary messages and to transmit the intermediary messages; and at least one second unit configured to receive the intermediary messages and to decode the intermediary messages to recover the first messages, wherein the interconnect unit comprises adders configured to add the second messages and a transmit bus configured to transmit the intermediary messages to the at least one second unit and wherein the adders comprise a number P of adders, wherein each second message is coded over a number M of bits, and wherein the adders form a succession of adders, each adder being connected to one of the first units by a parallel connection of transmission of at least a number M of bits, one of the adders being connected to the second unit by the transmit bus, said transmit bus being capable of transmitting in parallel a number T of bits with:

$$T=\mathrm{Ceil}(\mathrm{Log}\,2(P)*M)+Y$$

where Ceil corresponds to the ceiling function, where Log 2 corresponds to the base-2 logarithm function, and where Y is an integer, possibly zero, corresponding to bits which do not belong to the intermediary messages.

19. An integrated circuit as defined in claim 18, wherein each first unit is configured to provide the second messages on successive cycles of the integrated circuit and wherein the adders are configured to provide the intermediary messages on each cycle of the integrated circuit.

20. An integrated circuit as defined in claim 19, wherein one coding vector of the coding vectors is associated with each of the first units, wherein each first unit is configured to provide the bits at a given position of the second messages based on the bit at the given position of the first message and on the associated coding vector, and wherein the second unit is configured to provide the bits of the first message of one of the first units at the given position based on the bits at the given position of the intermediary messages.

21. An integrated circuit as defined in claim 18, further comprising a controller configured to modify an allocation of the coding vectors to the first units as a function of time.

22. An integrated circuit as defined in claim 18, wherein at least one of the first units is connected to the associated adder by a parallel connection of a number of bits equal to the product of number M and of an integer greater than or equal to 2.

* * * * *